United States Patent
Wright

(10) Patent No.: US 7,146,927 B1
(45) Date of Patent: Dec. 12, 2006

(54) CANOE-ANGLER

(75) Inventor: Andrew Joseph Wright, Milaca, MN (US)

(73) Assignee: Andrew Wright, Milaca, MN (US)

( * ) Notice: Subject to any disclaimer, the term of this patent is extended or adjusted under 35 U.S.C. 154(b) by 0 days.

(21) Appl. No.: 11/189,533

(22) Filed: Jul. 27, 2005

(51) Int. Cl.
*B63B 17/00* (2006.01)

(52) U.S. Cl. ........................ 114/364; 114/347
(58) Field of Classification Search ............. 114/343, 114/347, 364; 220/507; 206/315.11; 43/54.1
See application file for complete search history.

(56) References Cited

U.S. PATENT DOCUMENTS

| | | | | |
|---|---|---|---|---|
| 3,958,289 A | * | 5/1976 | Carlson | 114/364 |
| 4,766,838 A | * | 8/1988 | Johnson | 114/364 |
| 5,050,526 A | * | 9/1991 | Nelson et al. | 114/364 |
| 5,501,169 A | * | 3/1996 | Denker | 114/364 |
| 5,662,061 A | * | 9/1997 | Salathe | 114/347 |
| 6,014,833 A | * | 1/2000 | Benavidez | 43/54.1 |
| D459,078 S | * | 6/2002 | Tondino | D3/313 |
| 6,755,145 B1 | * | 6/2004 | Bolebruch | 114/347 |

\* cited by examiner

*Primary Examiner*—Lars A. Olson

(57) ABSTRACT

The Canoe-Angler is a tray style device designed for organizing fishing and other sporting equipment while occupying a canoe. The Canoe-Angler can hold a tackle box, a beverage, (2) fishing rods, and has an extra compartment for miscellaneous items. The tackle box compartment can also be used to hold binoculars, shotgun shells, etc., for other canoe-related sports and hobbies. The Canoe-Angler hangs over the canoe gunwales by adjustable arms for different canoe widths or differing widths within the canoe (front, middle, back, etc.). The Canoe-Angler consists of a molded plastic tray (with aforementioned equipment compartments), (2) aluminum frame tubes, (4) telescoping aluminum arm tubes, (4) aluminum angle gunwale clamps that are fastened to the telescoping tubes, and shock-cords holding opposing telescoping arms from inside the frame tubes.

12 Claims, 7 Drawing Sheets

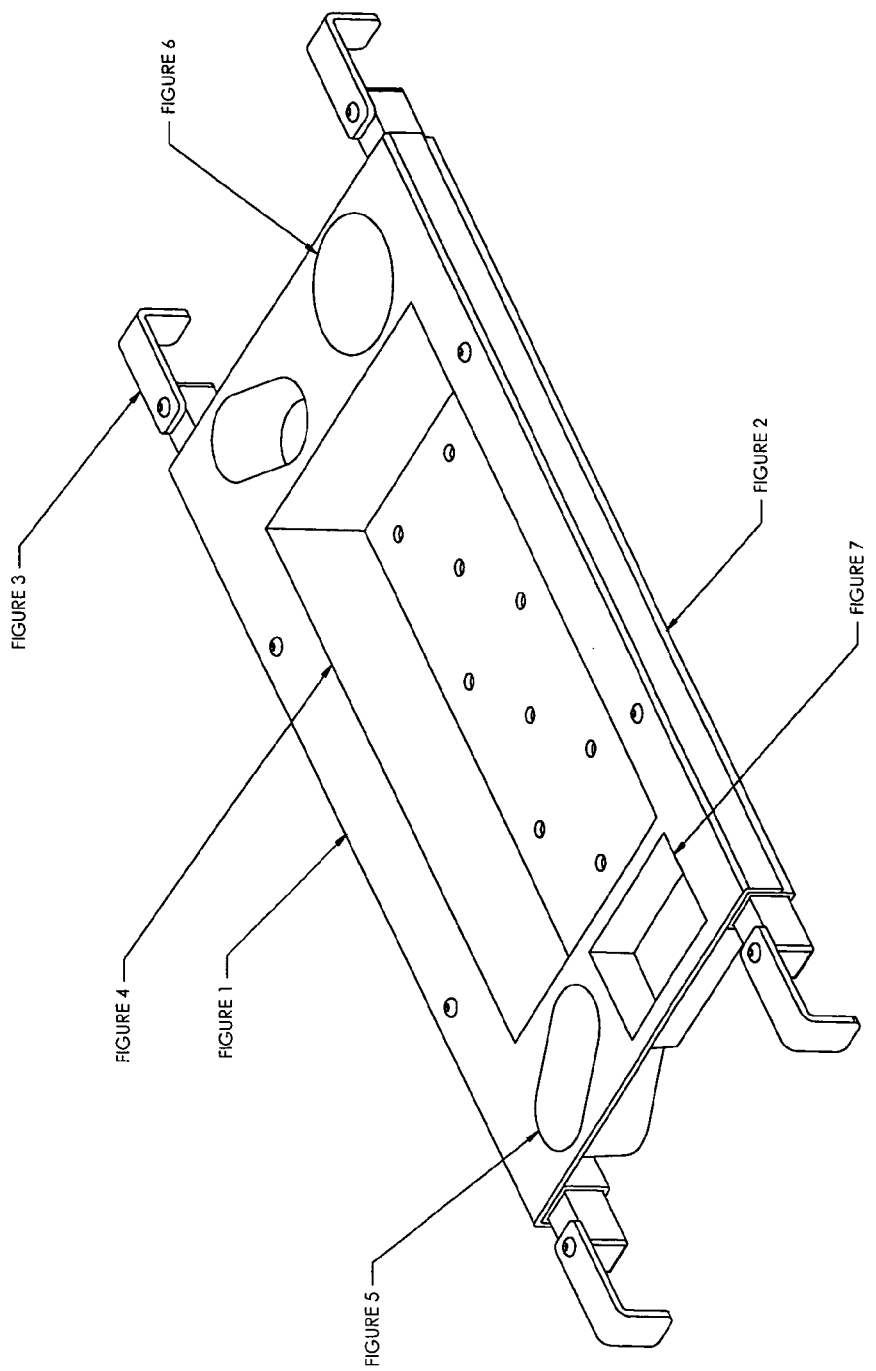
DRAWING 1

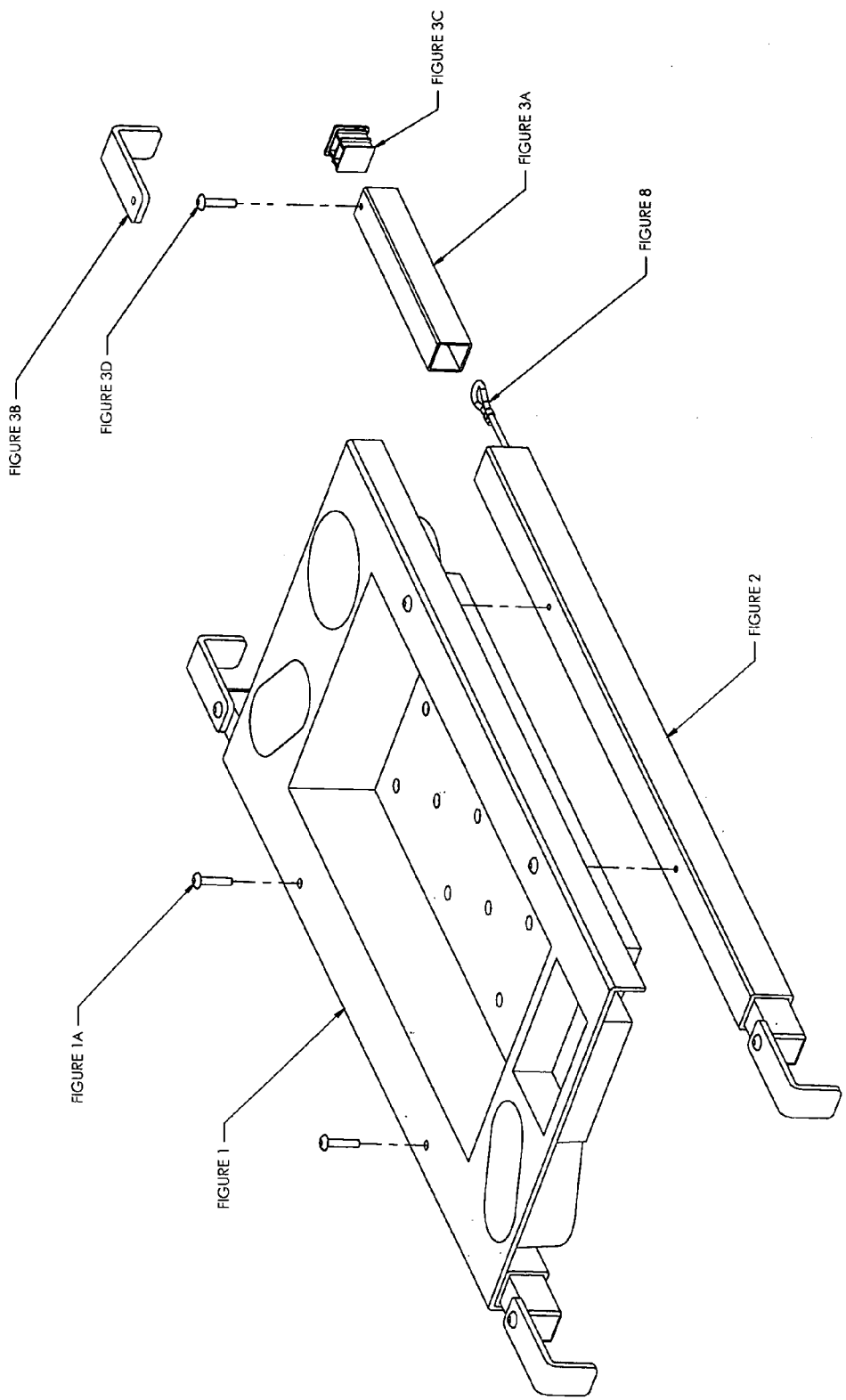
DRAWING 2

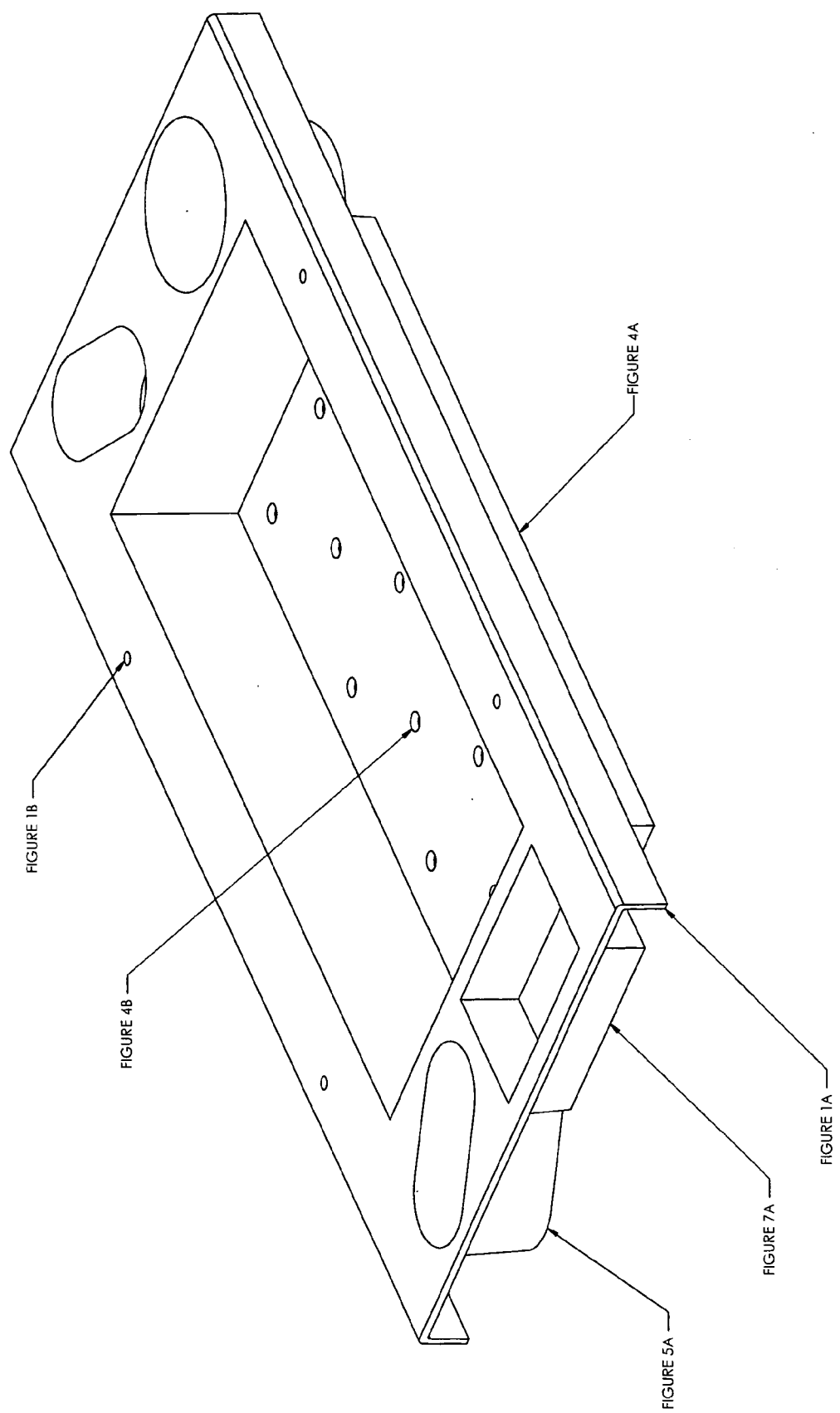
DRAWING 3

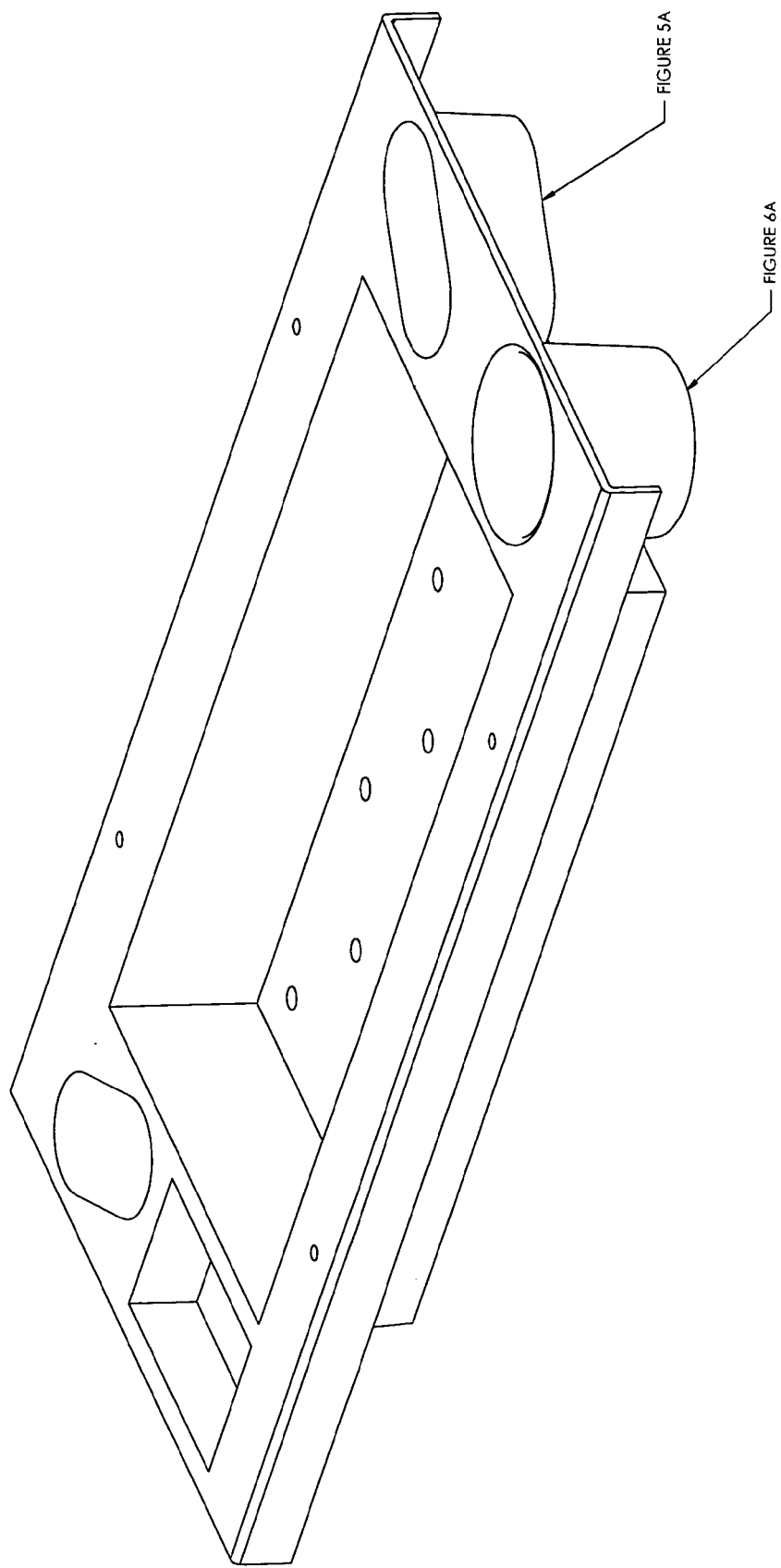

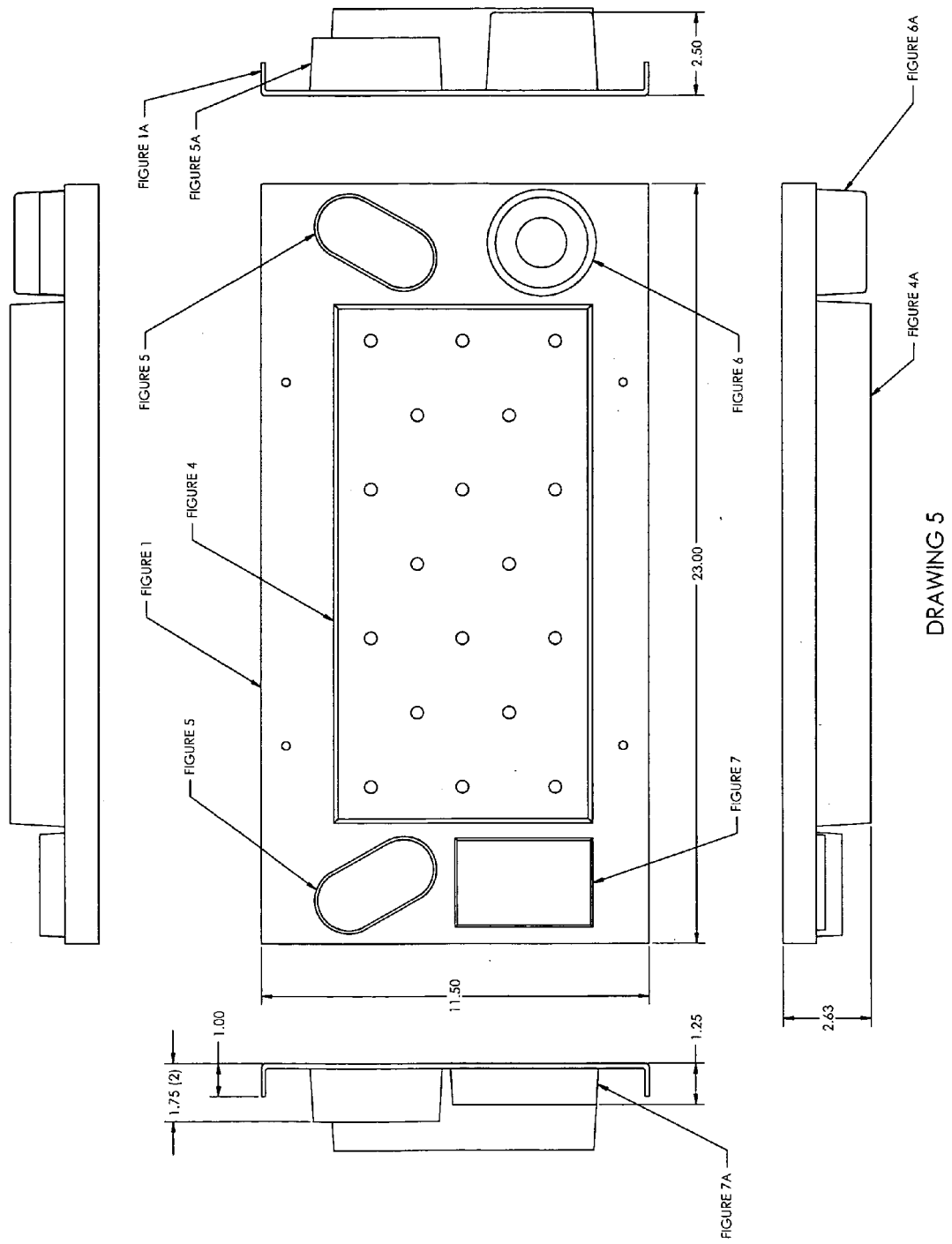
DRAWING 5

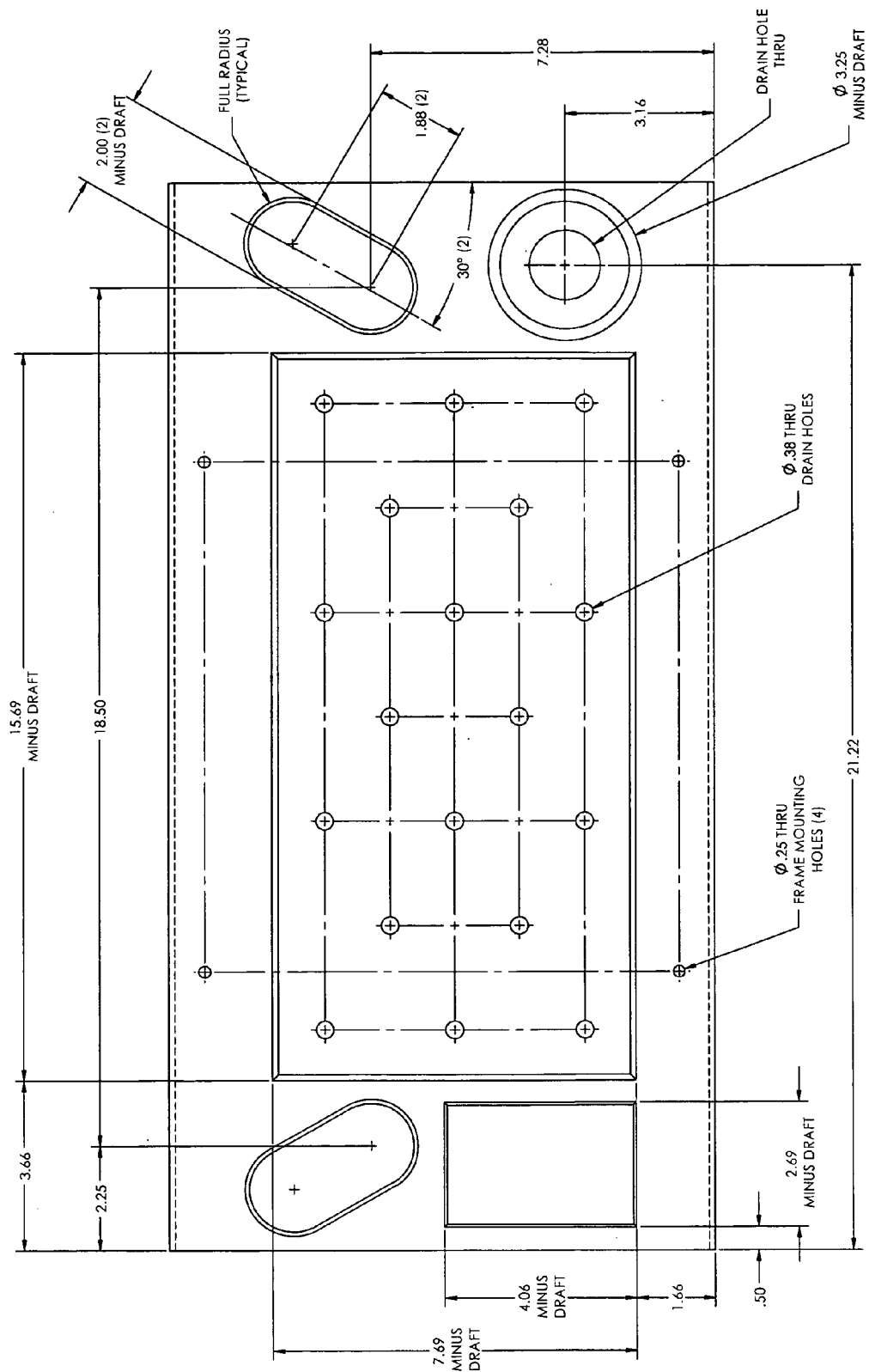
DRAWING 6

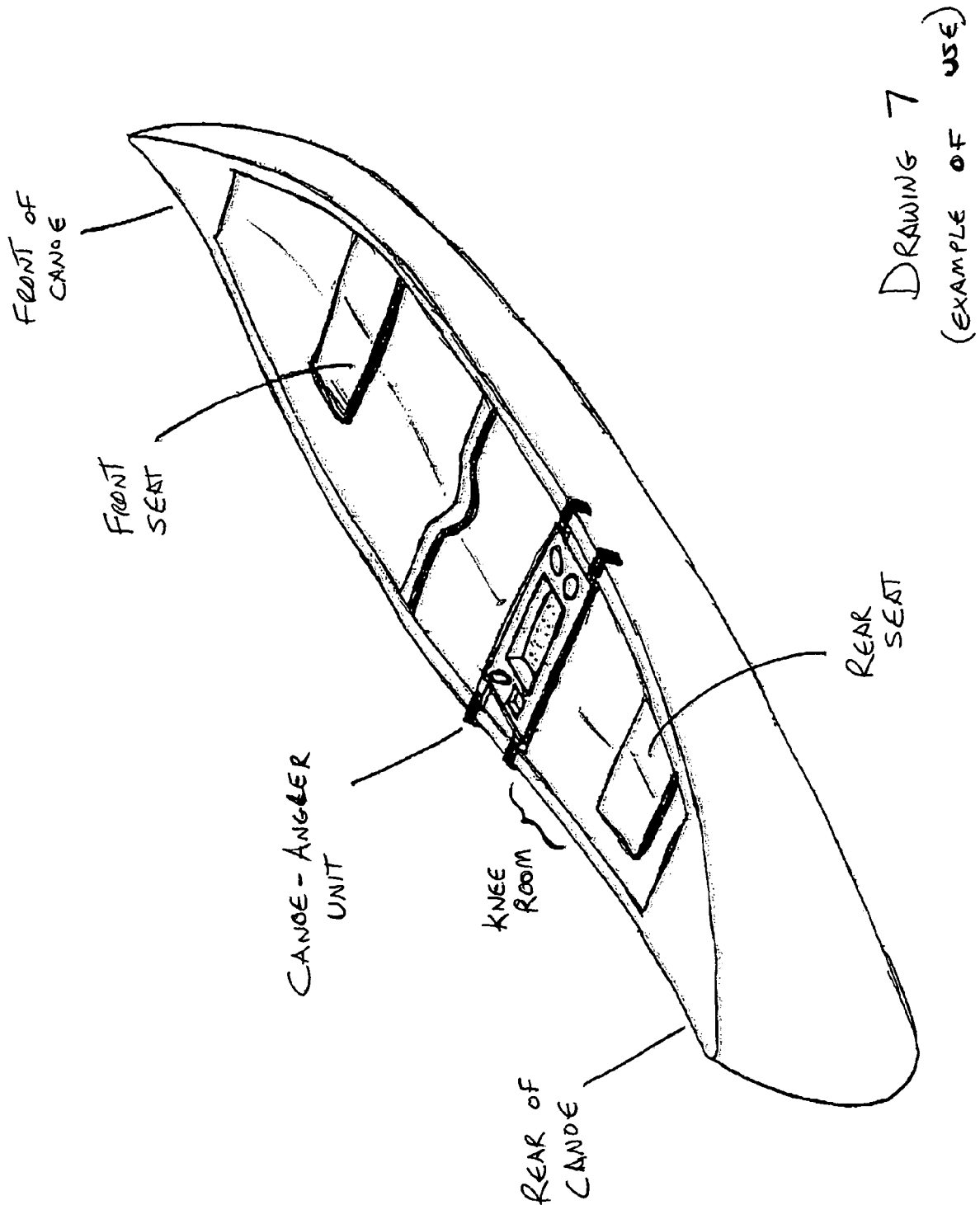

CANOE-ANGLER

BACKGROUND OF THE INVENTION

1. Field of the Invention

This invention relates to organizing fishing equipment and other sporting and hobby equipment used while occupying a canoe for convenience and improved accessibility. Unfortunately for canoe sports enthusiasts, gear is difficult to keep organized because of the streamline design of canoes. Therefore, tackle boxes, fishing rods, various favorite lures, binoculars and many other types of sporting and hobby equipment are often difficult or inconvenient to access and often require long or awkward stretching and positioning to reach. This can be dangerous as well as inconvenient.

2. Prior Art

The growing popularity of canoeing and canoe-related sports and hobbies has prompted many devices of convenience for canoeists. Existing devices to improve access or convenience for the aforementioned canoe-related sports and hobbies typically address only single pieces of equipment (i.e. fishing rod holder, beverage holder, etc.). The Canoe-Angler combines several solutions in a single, versatile, convenient, adjustable unit.

SUMMARY OF THE INVENTION

The Canoe-Angler is a tray style device designed for organizing fishing and other sporting equipment while occupying a canoe. The Canoe-Angler can hold a tackle box, a beverage, 2 fishing rods, and has an extra compartment for miscellaneous items. The tackle box compartment can also be used to hold binoculars, shotgun shells, etc., for other canoe-related sports and hobbies. The Canoe-Angler spans the canoe width and hangs over the canoe gunwales by adjustable arms for different canoe widths or differing widths within the canoe (front, middle, back, etc.). The Canoe-Angler consists of a molded plastic tray (with a compartment for a tackle box, (2) fishing rod holder slots, a beverage holder and a shallow compartment for miscellaneous items), (2) aluminum frame tubes, (4) telescoping aluminum arm tubes, (4) aluminum angle gunwale clamps that are fastened to the telescoping tubes, and shock-cords holding opposing telescoping arms from inside the frame tubes.

DESCRIPTION OF THE PREFERRED EMBODIMENT

The Canoe-Angler is a tray style device designed for organizing fishing and other sporting equipment while occupying a canoe. The Canoe-Angler has a compartment for a tackle box, a beverage holder, (2) fishing rod holder slots, and an extra compartment for miscellaneous items. The tackle box compartment can also be used to hold binoculars, shotgun shells, etc., for other canoe-related sports and hobbies. The Canoe-Angler spans the canoe width using gunwale clamp brackets to rest on the canoe sides (gunwales). It has adjustable telescoping arms for different canoe widths or different positions (wider or narrower) within the canoe (front, middle, back, etc.). The Canoe-Angler consists of a molded plastic tray (with a compartment for a tackle box, (2) fishing rod holder slots, a beverage holder and a shallow compartment for miscellaneous items), (2) aluminum frame tubes, (4) telescoping aluminum arm tubes, (4) aluminum angle gunwale clamps that are fastened to the telescoping tubes, and shock-cords holding opposing telescoping arms from inside the frame tubes. The user would sit in his or her seat and set the Canoe-Angler in place at a comfortable distance from their knees for paddling. The user would adjust the gunwale clamp arms to the sides (gunwales) of the canoe by pulling gently outward on the "spring" loaded adjustment arms individually and resting the Canoe-Angler on one side (gunwale) at a time.

DRAWINGS

DRAWING 1—A fully assembled Canoe-Angler unit:
  FIG. 1 indicates the main tray.
  FIG. 2 indicates (1) of (2) frame tubes.
  FIG. 3 indicates an adjustable arm assembly.
  FIG. 4 indicates the recessed tackle box compartment.
  FIG. 5 indicates (1) of (2) rod holder slots.
  FIG. 6 indicates the recessed beverage holder.
  FIG. 7 indicates the recessed lure/tool compartment.

DRAWING 2—An assembled Canoe-Angler unit with an exploded view:
  FIG. 1 indicates the main tray.
  FIG. 1A indicates (1) of (4) screws fastening the frame tubes to the main tray.
  FIG. 2 indicates (1) of (2) frame members.
  FIG. 3A indicates (1) of (4) telescoping adjustment arm tubes.
  FIG. 3B indicates (1) of (4) gunwale clamps.
  FIG. 3C indicates (1) of (4) purchased plastic tube end plugs.
  FIG. 3D indicates (1) of (4) screws fastening the gunwale clamp to the adjustment tube.
  FIG. 8 indicates (1) of (2) two-ended shock cords retaining the opposing telescoping adjustment arm assemblies inside the frame members.

DRAWING 3—The Canoe-Angler main tray isometric front-left view:
  FIG. 1A indicates (1) of (2) lip features which help align and retain the frame tubes.
  FIG. 1B indicates (1) of (4) punched holes for frame tube mounting.
  FIG. 4A indicates the recessed tackle box compartment depth.
  FIG. 4B indicates (1) of several punched holes for moisture drainage.
  FIG. 5A indicates the left side rod holder slot depth.
  FIG. 7A indicates the recessed lure/tool compartment depth.

DRAWING 4—The Canoe-Angler main tray isometric front-right view:
  FIG. 6A indicates the recessed beverage holder depth.
  FIG. 5A indicates the right side rod holder slot depth.

DRAWING 5—The Canoe-Angler tray orthographic, dimensioned views:
  FIGS. 1, 1A, 4, 4A, 5, 5A, 6, 6A, 7, 7A features and their respective depth dimensions.

DRAWING 6—The Canoe-Angler main tray top, detail dimension view.

DRAWING 7—Hand sketch of a Canoe-Angler shown placed in a canoe.

What is claimed is:

1. An adjustable organizing tray system adaptable to canoes of many sizes and to wider or narrower positions in those canoes; said organizing tray comprising a molded plastic tray with individual compartments for fishing, hunting, bird watching or other sporting equipment associated with canoeing, (2) aluminum tube frame members, (4) telescoping aluminum tube adjustment arms, (4) aluminum angle gunwale clamps, (2) shock cord retention devices and assembly fasteners; as shown in Drawings 1 and 2.

2. An adjustable organizing tray system adaptable to canoes as claimed in claim 1, wherein said molded plastic tray has a recessed compartment for secure placement of a tackle box, binoculars, shotgun shells, mounting of a depth-finder or containing any number of other canoe-related sporting, hunting or hobby equipment; and that this compartment has perforations in a bottom surface, as shown in FIG. 4 of Drawing 1, for water drainage in case of rain, water splashes or other moisture accumulation.

3. An adjustable organizing tray system adaptable to canoes as claimed in claim 1, wherein said molded plastic tray has a recessed beverage holder capable of securely holding a 12 ounce can or 20 ounce beverage bottle; and that this compartment contains a hole in the bottom, as shown in FIG. 6 of Drawing 1 and FIG. 6A of Drawing 4, for drainage in case of rain, splashing, beverage container condensation or other moisture accumulation.

4. An adjustable organizing tray system adaptable to canoes as claimed in claim 1, wherein said molded plastic tray has (2) through slots angled outward, as shown in FIG. 5 of Drawing 1, FIG. 5A of drawing 3 and FIG. 5A of drawing 4, for holding fishing rod handles so that the rods angle forward from a canoeist and outboard of the respective canoe sides; and that these slots are molded with a recessed "wall" depth to secure a reasonable forward angle of the fishing rods.

5. An adjustable organizing tray system adaptable to canoes as claimed in claim 1, wherein said molded plastic tray has a shallow compartment, as shown in FIG. 7 of Drawing 1 and FIG. 7A of Drawing 3, for convenient placement of fishing lures and tackle, utility knifes or tools, film canisters, or any number of other miscellaneous canoe-related sporting or hobby items for convenient access.

6. An adjustable organizing tray system adaptable to canoes as claimed in claim 1, wherein said molded plastic tray features a lip on both front and back, running the length of the tray, as shown in FIG. 1A of Drawing 3; and that this lip adds stiffness to the tray as well as providing a registration feature for the frame tube member.

7. An adjustable organizing tray system adaptable to canoes as claimed in claim 1, wherein said molded plastic tray is fastened to (2) aluminum tube frame members of the same length as the tray; as shown in FIG. 2 of Drawing 1 and FIG. 2 of Drawing 2.

8. An adjustable organizing tray system adaptable to canoes as claimed in claim 1, utilizing frame members as claimed in claim 6, also including (4) telescoping tubing arms, as shown in FIG. 3A of Drawing 2, that slide within the frame members noted in claim 6; and that these adjustment tubes are located to slide within the frame tubes opposing one another for canoe width adjustment.

9. An adjustable organizing tray system adaptable to canoes as claimed in claim 1, utilizing an adjustable frame system as described in claims 6 and 7, also including aluminum angle gunwale clamps, as shown in FIG. 3B of Drawing 2, fastened to the telescoping adjustment tubes noted in claim 7.

10. An adjustable organizing tray system adaptable to canoes as claimed in claim 1, wherein each telescoping adjustment tube noted in claim 7 contains a plastic plug in one end that covers a tube edge to provide a smooth handling surface; as shown in FIG. 3C of Drawing 2.

11. An adjustable organizing tray system adaptable to canoes as claimed in claim 1, utilizing (2) shock cord devices strung through the frame tubes mentioned in claim 6, and attached to opposing adjustment tubes for spring-type retention of the adjustment tubes within the frame tubes; as shown in FIG. 8 of Drawing 2.

12. An adjustable organizing tray system adaptable to canoes as claimed in claim 1, wherein said tray system is suspended between the sides (gunwales) of the canoe by drawing the adjustment arms outward against the light shock cord "spring" tension to the appropriate width and hanging the tray system over the gunwales; as shown in Drawing 7.

* * * * *